UNITED STATES PATENT OFFICE.

JOHN W. McFARLAND, OF ROCHESTER, MISSOURI.

LINIMENT.

SPECIFICATION forming part of Letters Patent No. 249,069, dated November 1, 1881.

Application filed August 4, 1881. (No specimens.)

*To all whom it may concern:*

Be it known that I, JOHN W. MCFARLAND, of Rochester, in the county of Andrew and State of Missouri, have invented certain new and useful Improvements in Medical Compounds; and I do hereby declare that the following is a full, clear, and exact description of the invention, which will enable others skilled in the art to which it appertains to make and use the same.

My discovery relates to liniments or embrocations for the cure of burns, scalds, sprains, the alleviation of rheumatic pains, and external use generally in cases where a rubefacient is required; and it consists in a lotion compounded by mixing the following ingredients in about the proportions stated, to wit: One pint of spirits of turpentine, one pint of apple-vinegar, one ounce of gum-camphor, one-half ounce of corrosive sublimate, (bichloride of mercury,) one ounce of oil of cedar-wood, six ounces of table-salt, and two eggs well beaten up.

The camphor should first be dissolved in the turpentine, after which the oil of cedar-wood is added. After this has been thoroughly stirred I add the vinegar, then the salt, and, lastly, the eggs and bichloride of mercury. This order of mixing the ingredients may be varied, however, if desired, as I do not confine myself to any particular method of mixing.

It is obvious that this compound can only be used externally, and must, under no circumstances, be administered internally.

I claim and desire to secure by Letters Patent of the United States—

A rubefacient liniment or embrocation composed of spirits of turpentine, vinegar, gum-camphor, corrosive sublimate, (bichloride of mercury,) oil of cedar-wood, salt, and eggs, mixed in about the proportions herein specified.

In testimony that I claim the foregoing as my own I have hereunto affixed my signature in presence of two witnesses.

<div style="text-align:right">
his<br>
JOHN W. × McFARLAND.<br>
mark.
</div>

Witnesses:
ELBRIDGE G. ROBINSON,
JOHN A. KIMBERLIN.